Feb. 17, 1970  H. LINDEBOOM  3,495,841
HIGH PRESSURE FLUID SEAL WITH CONTROLLED LEAKAGE
Filed May 25, 1964  2 Sheets-Sheet 1

INVENTOR
HERMAN LINDEBOOM
BY
William Frederick Werner
ATTORNEY

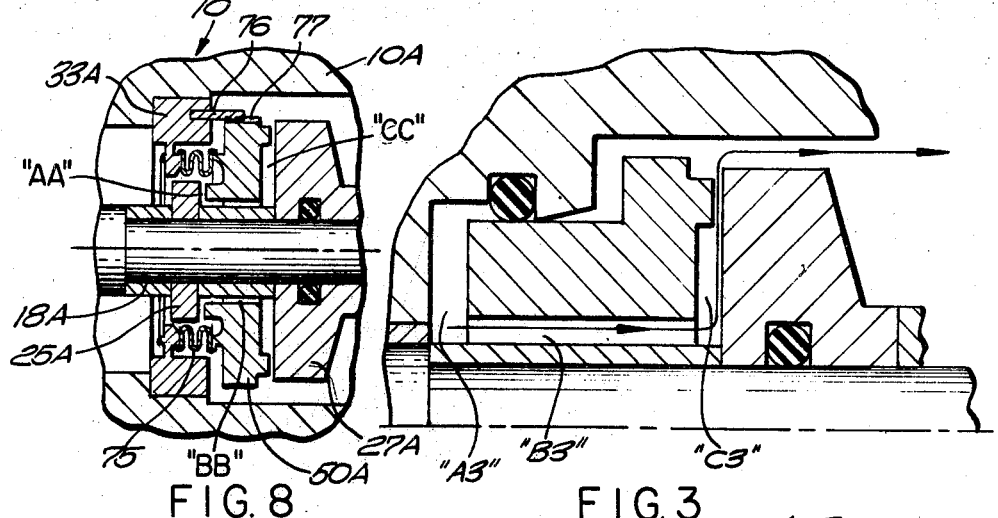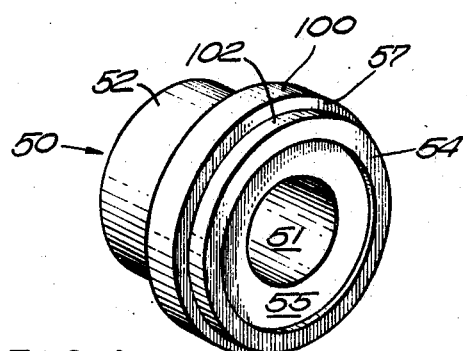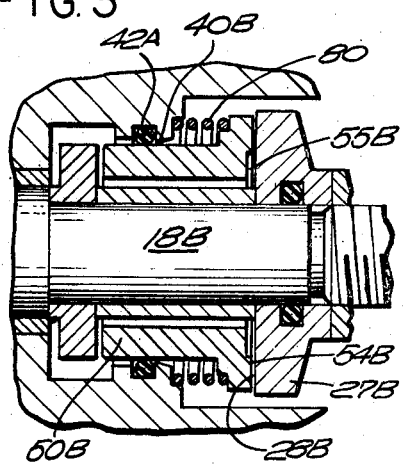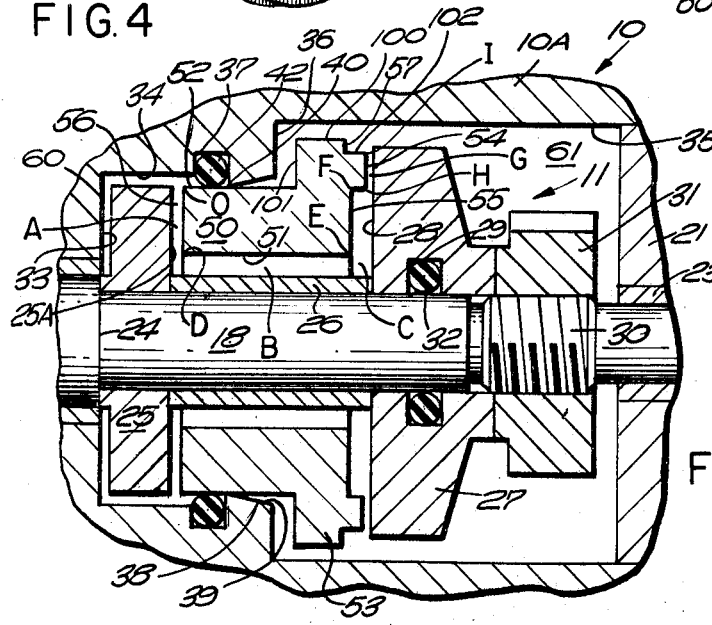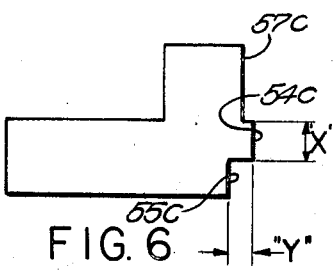

United States Patent Office 3,495,841
Patented Feb. 17, 1970

3,495,841
HIGH PRESSURE FLUID SEAL WITH CONTROLLED LEAKAGE
Herman Lindeboom, Warwick, R.I., assignor to Sealol, Inc., Warwick, R.I., a corporation of Delaware
Filed May 25, 1964, Ser. No. 369,718
Int. Cl. F16j 15/34, 15/54
U.S. Cl. 277—27         5 Claims This invention relates to high pressure fluid seals and more particularly to fluid seals embodying physical characteristics which permit a metered flow between the sealing elements.

An object of the present invention is to provide a fluid seal, for use with a rotary shaft, which employs a fluid pressure responsive sealing member or piston arranged to move relative to a fixed sealing member to establish a fluid seal under conditions which permit controlled leakage between the piston and the fixed sealing member.

Another object of the present invention is to provide a fluid seal for use with a rotary shaft, which includes a piston or pressure responsive sealing member having opposed fluid contacting walls for governing the effective biasing of the fluid pressure to effectuate metered leakage between the sealing elements comprising the piston and a sealing ring fixed to the rotary shaft.

Still another object of the present invention is to provide a fluid seal for use with a rotary shaft which is operable under conditions of extremely high pressures, high speeds, and high temperatures while eliminating inordinate wear on the sealing members.

A further object of the present invention is to provide a high speed, high temperature, high pressure rotary fluid seal which eliminates vibration of the pressure responsive sealing member.

And still another object of the present invention is to provide a rotary fluid seal for use with very high fluid pressures, be the fluid, liquid or gas, in which the pressure responsive sealing member is never in direct physical contact with the rotating sealing ring; the mating surfaces being separated by the tenacity of the viscosity or surface tension of the fluid, liquid or gas, passing through the seal.

And another object of the present invention is to provide a high pressure fluid seal for use with a rotary shaft which is economical to manufacture, yet durable and reliable in use.

Other objects of the present invention will become apparent in part and be pointed out in part in the following description and claims.

In environments where fluids are pumped or otherwise circulated it has long been a practice to seal the rotary shaft which is a part of the pumping or circulating apparatus by utilizing a mechanical seal. Commonly, the shaft extends from the zone of the fluid to a zone outwardly therefrom in the atmosphere and, for rather obvious reasons, excessive fluid flow across the shaft from the fluid zone to the atmospheric zone is undesirable. The aforementioned mechanical seals, conventionally, take the form of a rotary member supported on the rotary shaft. The rotary member being provided with a sealing face which bears tightly, by means of spring pressure, against a similar sealing face of a companion fixed sealing member; thereby to secure zero leakage between the sealing members. Thus, as the shaft is rotated the interface between the fixed and rotary sealing members provides a barrier against the passage of fluid across the rotary shaft. Such mechanical seals have been utilized with a considerable degree of success in sealing fluids which are moved under relatively low pressures. However, severe problems have been presented when these seals have been used in the presence of fluid pressures in the order of 1000 p.s.i. and higher, which is the pressure area to which the present invention is particularly relevant. Under these relatively high pressures, i.e., 1000 p.s.i. and higher, the conventional mechanical seals which have as their aim to secure zero leakage past the sealing interface soon fail. This is due, primarily, to exteme wear caused by excessive loading between the rotary and fixed sealing members in an effort to maintain zero leakage therepast.

Recognizing the foregoing, workers in the art have attempted in various ways to effect a satisfactory high pressure fluid seal having controlled leakage for use with a rotary shaft. Factors of cost and design have taught that the acceptance of such fluid seals with controlled leakage in high pressure environments represent the practical solution to this high pressure sealing problem. Consequently, fluid seals providing for controlled leakage have been proposed which require auxiliary pumping arrangements. This proposal requires design and apparatus which becomes quite costly. Another approach to the problem has been to provide orifices or grooves across the faces of the sealing members in order to permit controlled leakage past the sealing interface. This approach presents complexities of manufacture and operation which the present invention obviates.

With all of the foregoing factors in mind it is an object of the present invention to provide a fluid seal for use with a rotary shaft which provides for controlled leakage past the seal.

Like reference numerals refer to like parts in the accompanying drawings in which:

FIGURE 3 is an enlarged, fragmentary cross sectional view, of a modified form of seal construction.

FIGURE 4 is a perspective view of the piston.

FIGURE 5 is a fragmentary cross sectional view of a modified form of seal construction illustrated in FIGURE 2.

FIGURE 6 is a view illustrating a modified form of the front end of the piston.

FIGURE 7 is an enlarged fragmentary cross sectional view of FIGURE 2.

FIGURE 8 is a fragmentary cross sectional view of still another modified form of seal construction.

Figure 1:
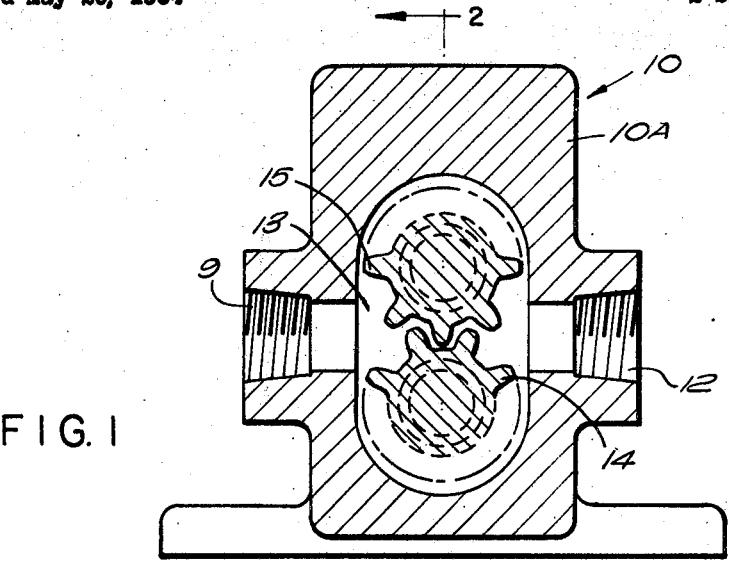
FIGURE 1 is a transverse vertical cross sectional view taken on line 1—1 of FIGURE 2 illustrating a typical pump incorporating the fluid seal of the present invention.
Figure 2:
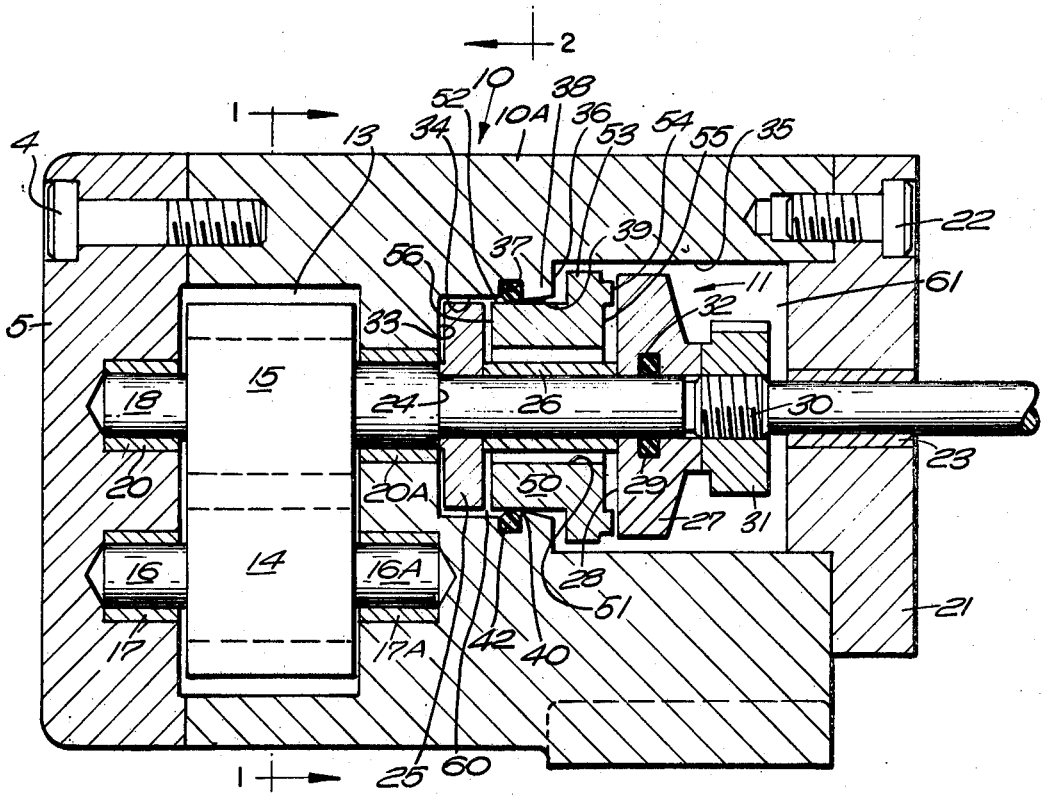
FIGURE 2 is a longitudinal cross sectional view taken on line 2—2 of FIGURE 1.

Referring to FIGURES 1 and 2: a housing, generally indicated by reference numeral 10, is provided, consisting of a medial unit 10A having a hollow interior, generally indicated by reference numeral 11. A flange 21 provided with a bearing 23, is fastened to medial unit 10A by means of bolts 22. Flange 21 closes one end of hollow interior 11. An end plate 5 provided with bearings 17 and 20 and fastened to medial unit 10A by means of bolts 4, closes the other end of hollow interior 11. In order to more easily understand the present invention, hollow interior 11 will be referred to hereinafter sectionally. An inlet port 9 and a discharge port 12 communicate with a chamber portion 13 of hollow interior 11. A gear 14 located in chamber 13 is fastened to a short shaft having oppositely projecting ends 16, 16A which are rotatively mounted in bearings 17, 17A, respectively. Bearing 17A is located in medial unit 10A.

A gear 15 located in chamber 13 and in mesh with gear 14 is fastened to a drive shaft 18 rotatively mounted in bearings 20, 20A and 23. Bearing 20A is located in medial unit 10A. Shaft 18 projects beyond the confines of housing 10 so as to be connected to a suitable source of power, such as an electric motor (not shown), which serves to rotate shaft 18 and gears 14, 15 functioning as a pump.

Shaft 18 is provided with a shoulder 24. A disk 25 is positioned upon shaft 18 with a drive fit abutting shoulder 24. A collar 26 is located upon shaft 18 with a drive fit abutting disk 25. A fixed mating ring 27 provided with a mating face 28 and a circular groove 29 is located upon shaft 18 with a forced fit. Shaft 18 is provided with a threaded area 30. A thrust nut 31 is rotatively mounted upon threaded area 30 abutting fixed sealing ring 27. Thrust nut 31 forces fixed sealing ring 27 against the end of collar 26. An O ring or other fluid packing 32 is located in circular groove 29 to provide a fluid tight seal around shaft 18.

The essence of the present invention will now be described. Hollow interior 11 is provided with an abutment 33, a circular wall 34, an internal surface 35 and a circular projection 36. Circular wall 34 is provided with a circular recess 37 and a circumferential rib 38 which is tapered at 39 to provide a circular knife edge 40.

A pressure responsive sealing ring or piston 50, generally of tubular configuration to surround shaft 18 and collar 26, is provided with a circular inner surface 51, a circular outer surface 52, a circular projection 53, a circular sealing face 54, a front pressure surface 55, a rear pressure surface 56, and a circular rim 57.

Piston or sealing ring 50 is supported by a line contact through the engagement of circular outer surface 52 with circular knife edge 40. This line contact support serves advantageously, to minimize the frictional drag between piston 50 and circular knife edge 40 as piston 50 is slid axially of shaft 18. Moreover, piston 50 is thereby afforded a limited range of rocking movement which is advantageous in maintaining parallelism between circular sealing face 54 and mating face 28. In this manner circular sealing face 54 is self-adjusting and self-aligning with mating face 28.

To the end that fluid may be prevented from passing between circular outer surface 52 and circular wall 34, an O ring 42 is seated in circular recess 37 to surround circular outer surface 52. In this manner a fluid receiving cavity 60 and a fluid receiving compartment 61 become separate designated areas in hollow interior 11.

With reference to FIGURES 2 and 7; fluid in cavity 60 may flow into space "A" formed between the surface 25A of disk 25 and rear pressure surface 56 and into space "B" formed between circular inner surface 51 and the outside surface of collar 26. The fluid will then flow into space "C" formed between mating face 28 and front pressure surface 55. It will be observed that in FIGURE 7 spaces "A," "B" and "C" are approximately equal in width so that the fluid under pressure in contact with piston 50 is free to act with the full force of the pressure on front pressure surface 55 and rear pressure surface 56 with circular inner surface 51 providing an unrestricted space or passageway for the fluid to flow from space "A" to space "C." In this manner the difference in area between front pressure surface 55 and rear pressure surface 56 provides the areas upon which the fluid pressure may act to force circular sealing face 54 into engagement with mating face 28. The width of circular sealing face 54 may be varied whereby the area of front pressure surface 55 may be varied to increase or decrease the difference between the areas of front pressure surface 55 and rear pressure surface 56. The difference in area between the front 55 and the rear 56 pressure surfaces will be such that circular sealing face 54 will move toward and engage mating face 28 with a force equal to the force of the fluid pressure acting upon the difference in area between the area of front pressure surface 55 and rear pressure surface 56. This condition causes undue wear on surfaces 54 and 28. It is a principal object of the present invention to overcome this condition of wear and friction between the surfaces.

It has been discovered that to reduce the width of space "A" to a dimension of approximately nine hundred micro-inches (.0009) so as to create a restrictive passageway "A," causes a pressure drop from point O to point "D" across rear pressure surface 56. The resultant of fluid pressure acting upon rear pressure surface 56 is one half the total of the sum of the pressures at point O plus point "D." In this manner the force of the fluid acting upon rear pressure surface 56 is materially reduced over the force of the fluid acting upon rear pressure surface 56 where there is an unrestricted flow of fluid through passageway "A." This fact is very important when fluid pressure in the nature of ten thousand pounds per square inch is encountered. This reduction in fluid pressure, through the use of a restricted passageway "A" is also important in controlling the difference in pressure between the fluid pressure acting on rear pressure surface 56 and front pressure surface 55.

The present structural concept requires that space "C" be reduced to a width of two hundred micro-inches (.0002) to provide a cooperating restrictive passageway opposite to restrictive passageway "A." There will be a pressure drop between points "E" and "F" so that the resultant of fluid pressure acting upon front pressure surface 55 is one half the total of the sum of the pressure at point "E" plus point "F."

Unrestricted passageways "A," "B" and "C" provide a static seal. That is fluid pressure forces the piston 50 in the direction of the surface having the smallest area, thereby engaging the sealing surface 54 of the piston 50 with the mating face 28 to create a fluid tight seal.

The present structure contemplates a dynamic seal which is created by providing a controlled or metered fluid leakage between sealing surface 54 and mating face 28. It is structurally desired to have circular sealing face 54 separated from mating face 28 by approximately one hundred micro-inches (.0001), a distance equal to the thickness of a film of oil. The surface tension or viscosity of the fluid provides a dampening effect upon piston 50 through circular sealing face 54 and mating face 28.

In the present structure space "B" is an unrestricted passageway for the fluid flowing from restricted passageway "A" to restricted passageway "C."

A sealing element constructed in accordance with the foregoing principles will provide a piston 50 upon which the fluid pressure balances the forces acting upon opposite pressure faces 55, 56 to effect physical separation of mating face 28 from circular sealing face 54.

In operation, it can be assumed that a fluid is flowing into chamber 13 through inlet port 9 and that shaft 18 is being rotated from its power source as earlier related. In consequence thereof the fluid is impelled out of outlet port 12 under relatively high pressure as already set forth. It will be readily appreciated that the fluid under a high static pressure within chamber 13, the fluid will leak past the clearances of the various parts of the pump and it is in this manner that leakage can occur in the illustrated pump. Thus, this fluid under high pressure will travel from chamber 13, through bearing 20A and into fluid cavity 60 due to clearance between bearing 20A and shaft 18. This flow along shaft 18 to fluid cavity 60 is not deleterious to the operation of the pump so long as this flow does not continue outwardly into the atmosphere. It is this excessive leakage which the fluid seal of the present invention advantageously restricts.

As the fluid under its relatively high system pressure enters fluid cavity 60, as just stated, it flows into and through restrictive passageway "A" from point O to point "D" encountering a pressure drop on the way between points O and "D" when the fluid has flow. That is dynamic pressure as opposed to static pressure.

The fluid will exert an axial force, equal to the resultant of pressure, or mean pressure, between points O and "D," against the area of rear pressure surface 56 to urge piston 50 and circular sealing face 54 towards mating face 28.

The fluid will flow from restrictive passageway "A" into unrestrictive passageway "B" with a negligible pressure drop between points "D" and "E." The fluid pressure in passageway or space "B" does not influence the axial position of piston 50.

The fluid will then flow from passageway "B" into and through restrictive passageway "C" from point "E" to point "F" encountering a pressure drop on the way when the fluid has flow. The fluid will exert an axial force equal to the resultant of pressure, or mean pressure, between points "E" and "F," against the area of front pressure surface 55 to urge piston 50 and circular sealing face 54 away from mating face 28.

The fluid will then flow in droplets across circular sealing face 54 from point "H" to point "I." There is a negligible pressure drop between points "F" and "H." The fluid will exert an axial force equal to the resultant of pressure or mean pressure between points "H" and "I" against the area of circular sealing face 54 to urge piston 50 and circular sealing face 54 away from mating face 28.

The fluid will flow from point "I" into compartment 61 where the fluid pressure is less than the fluid pressure in cavity 60. The fluid pressure in compartment 61 is normally substantially equal upon circular rim 57, surface 100, surface 101, surface 102, and circular outer surface 52 between knife edge 40 and surface 101.

The fluid pressure acting upon surfaces 102, 100 and 52 does not influence the axial position of piston 50. The fluid pressure acting upon circular rim 57 will be opposed by the fluid pressure acting upon surface 101 and will provide a force influencing the axial movement of piston 50 toward mating face 28. This force is readily calculable.

The present invention determines the axial position of piston 50 in relation to disk 25 and mating face 28. As soon as the forces acting opposite to each other are in the desired ratio of balance, the fluid pressure will axially locate piston 50 to permit controlled or metered leakage of the fluid between circular sealing face 54 and mating face 28 to provide the necessary flow to sustain a dynamic seal.

Passageway "A" should be greater in width than passageway "C" but both must provide a restrictive passageway to insure a fluid pressure drop on the fluid as it flows through the passageway. Space B is unrestricted and should be greater in width than passageway "A." The wider the passageway the less the restriction and the lower the pressure drop. In the example given, the greater pressure drop and therefore the greater restriction is desired in passageway "C." The difference in pressure drops and therefore the difference in widths between passageways "A" and "C" is determined by the summation of forces acting upon the areas of rear pressure surface 56 plus surface 101 and minus the sum of the areas of front pressure surface 55, circular sealing face 54 and circular rim 57.

The areas hereinmentioned can be fixed or determined and therefore it is a mere matter of mathematics to calculate the areas of the respective components in relationship to the fluid pressure operating in the unit to determine the proportioning necessary to maintain a predetermined fluid thickness between circulating sealing face 54 and mating face 28.

It will be evident that a slight leakage of fluid will occur. The fluid so emitted into compartment 61 will readily be drained off.

Attention is directed to FIGURE 8, a fragmentary cross sectional view illustrating the fixed sealing ring 27A, the piston 50A, the disk 25A, the shaft 18A and a fragmentary showing of the housing 10. The purpose of FIGURE 8 is to show a modified form of fluid sealing mechanism which encompasses an expansible bellows 75.

In applications where the fluid seal is subject to high temperatures and/or high pressures the O ring 42 will disintegrate or fail as a fluid sealing element. Therefore, a more sturdy fluid sealing element is needed. A metallic expansible bellows is such an element.

Expansible metallic bellows 75 is fastened on one end to chamber abutment 33A in the form of a collar fixed in the chamber wall and on the other end to piston 50A. Spaces "AA" "BB" and "CC" function in the manner described for spaces "A," "B," "C," respectively.

Attention is directed to FIGURE 5, a fragmentary cross sectional view illustrating the application of a coil spring 80 to piston 50B cooperating with fixed mating ring 27B.

A spring 80 is needed to provide a force sufficient to overcome the friction of the O ring 42A and knife edge 40B on piston 50B so as to prevent a wide gap between mating face 28B and circular sealing face 54B. A condition which may exist when the piston 50B is originally assembled or if a period of time elapses between the stopping of shaft 18B and the starting up or initial rotation of shaft 18B after being idle.

The fluid pressure may be termed a "static head." If a static head is lacking circular sealing face 54B will separate itself from mating face 28B thereby providing a gap. A resilient means is needed which will act on the piston 50B to close the gap and mate face 54B with face 28B. The "static head" acting on front pressure surface 55B will overcome the resilient force, such as in spring 80, to provide the controlled leakage herein described and claimed by separating faces 54B and 28B.

FIGURE 8 also illustrates a pin 76 fastened in medial unit 10A and projecting into a slot 77 and located in piston 50A to prevent piston 50A from rotating with shaft 18A. Piston 50A may still move in a direction toward and away from fixed sealing ring 27A.

From the foregoing it will be appreciated that the present invention provides a new and novel fluid seal operative under varying pressure conditions to effectively seal a fluid unit from excessive loss of fluid, yet permitting controlled leakage in order to afford a lubricating film across the sealing interfaces. This film is advantageously presented across the sealing interfaces of the cooperative sealing members to prevent the sealing rings from breaking down, even in environments of high fluid pressure. Moreover, the present invention achieves the foregoing objectives while utilizing sealing rings having plane sealing faces which obviate the necessity for expensive machining and fitting.

Reference is made to FIGURE 6 wherein a modified form of circular sealing face 54C is diagrammatically shown. The modification encompasses placing circular sealing face 54C in a location which varies the area of front pressure surface 55C and circular rim 57C relative to each other and to area "X" of circular sealing face 54C. Area "X" may be increased or decreased as desired. It is obvious that dimension "Y" may be varied as desired.

Reference is made to FIGURE 3 wherein a fragmentary cross sectional view of a modified form of seal construction is illustrated. Space "A3" is shown as an unrestricted passageway, whereas space "A" in FIGURE 7 is intended to be a restricted passageway. The arrows show the direction of flow of the fluid in a dynamic seal. Space "C3" is intended to be a restricted passageway the same as passageway "C" in FIGURE 7. However, FIGURE 3 is shown as an enlarged view to clearly illustrate the relationship of the piston and the parts which cooperate with the piston. The present invention contemplates a restricted passageway "C3" and unrestricted passageways at "A3" and "G3", FIGURE 3 and restricted passageways "A" and "C" and unrestricted passageway "B" FIGURES 2 and 7.

Since certain changes may be made in the above device without departing from the scope of the invention herein involved, it is intended that all matter contained in the above description or shown in the accompanying drawing shall be interpreted as illustrative only and not in a limiting sense.

What I claim is:

1. A fluid circulating unit comprising a housing having a chamber, a fluid receiving cavity and a fluid receiving compartment, means for circulating fluid under pressure enclosed within said chamber, an inlet port for admitting fluid to said chamber, an outlet port for discharging the fluid from said circulating means and chamber under pressure, a shaft extending through said housing for driving said circulating means, a fixed mating ring mounted on said shaft in spaced relationship to said circulating means, said fixed mating ring having a mating face, a disk mounted on said shaft, said disk being spaced apart from said fixed mating ring and located in said fluid receiving cavity, a fluid passage connecting said chamber with said fluid receiving cavity, an axially movable sealing ring disposed in said fluid receiving cavity, surrounding said shaft and forming a fluid passageway between said sealing ring and said shaft, said sealing ring having a circular sealing face confronting said mating face, a front pressure surface adjacent said circular sealing face forming a first fluid restrictive passageway between said front pressure surface and said mating face, and a rear pressure surface oppositely disposed from said front pressure surface forming a second fluid restrictive passageway between said rear pressure surface and said disk to provide fluid communication between said fluid receiving cavity, said fluid passageway and said first restrictive passageway, a rib projecting from said housing and provided with a circular knife edge for guiding the axial movement of said sealing ring, a fluid seal fixed between said rib and said sealing ring, said sealing ring being movable under fluid pressure passing through said second fluid restrictive passageway and under oppositely disposed fluid pressure passing through said first fluid restrictive passageway and between said circular sealing face and said mating face to control the passage of fluid between said mating face and said circular sealing face.

2. A fluid circulating unit comprising a housing having a fluid receiving cavity, a shaft extending through said housing, a fixed mating ring, provided with a mating face, secured to said shaft, a disk secured to said shaft in spaced relation to said fixed sealing ring and located in said fluid receiving cavity, an axially movable sealing ring disposed in said fluid receiving cavity, surrounding said shaft between said disk and said fixed mating ring and forming a fluid passageway between said sealing ring and said shaft, said sealing ring having a circular sealing face confronting said mating face, a front pressure surface, adjacent said circular sealing face, forming a first fluid restrictive passageway between said front pressure surface and said mating face, and a rear pressure surface oppositely disposed from said front pressure surface forming a second fluid restrictive passageway between said rear pressure surface and said disk, a rib projecting from said housing and provided with a circular knife edge for guiding the axial movement of said sealing ring, a fluid seal fixed between said rib and said sealing ring, said second fluid restrictive passageway providing a fluid pressure drop means between said fluid receiving cavity and said fluid passageway and said first restrictive passageway providing a second fluid pressure drop means between said fluid passageway, and said first restrictive passageway, whereby said circular sealing face and said mating face are held in spaced relation to permit a controlled amount of fluid to pass therebetween.

3. A fluid seal assembly comprising a housing having a fluid receiving cavity, a shaft extending through said housing, a fixed mating ring, provided with a mating face, secured to said shaft, a disk secured to said shaft in spaced relation to said fixed mating ring and located in said fluid receiving cavity, an axially movable sealing ring disposed in said fluid receiving cavity, surrounding said shaft between said disk and said fixed mating ring and forming an unrestricted fluid passageway between said sealing ring and said shaft, said sealing ring having a circular sealing face confronting said mating face, a front pressure surface, adjacent said circular sealing face, forming a first fluid restrictive passageway having a width of approximately two hundred microinches between said front pressure surface and said mating face, said circular mating face being selectively positioned on said sealing ring to vary the length of said first fluid restrictive passageway, a rear pressure surface on said sealing ring oppositely disposed from said front pressure surface forming a second fluid restrictive passageway having a width of approximately nine hundred micro-inches between said rear pressure surface and said disk, support means in said housing for guiding the axial movement of said sealing ring, fluid seal means interposed between said housing and said sealing ring, said second fluid restrictive passageway providing a fluid regulating means in the form of a pressure drop equal to the mean pressure across the rear pressure surface and a force acting to move said sealing ring toward said mating ring equal to the sum of the mean pressure times the area of said rear pressure surface, said first fluid restrictive passageway providing a fluid regulating means in the form of a pressure drop equal to the mean pressure across the front pressure surface and a force acting to move said sealing ring away from said mating ring equal to the sum of the mean pressure times the area of said front pressure surface to provide a fluid passageway having a width of one hundred micro-inches between said mating ring and said circular sealing face, thereby to provide a dynamic sealing ring.

4. A high pressure fluid seal with controlled leakage comprising a housing having a fluid receiving cavity, a shaft extending through said housing, a fixed mating ring, provided with a mating face, fixed on said shaft, an axially movable sealing ring supported in said housing and surrounding said shaft and providing an unrestricted fluid passageway between said sealing ring and said shaft, said sealing ring having a circular sealing face confronting said mating face, a front pressure surface, adjacent said circular sealing face, forming a first fluid restrictive passageway having a width of approximately two hundred micro-inches between said front pressure surface and said mating face, and a rear pressure surface oppositely disposed from said front pressure surface, a fluid seal between said housing and said sealing ring providing a fluid receiving compartment in said housing, fluid in said cavity flowing past said rear pressure surface providing a force equal to the pressure of the fluid times the area of said rear pressure surface, tending to axially displace said sealing ring toward said mating ring, said fluid flowing through said unrestricted fluid passageway to said restricted passageway providing a force equal to the pressure of the fluid times the mean pressure acting upon the area of said front pressure surface, tending to axially displace said sealing ring away from said mating ring to provide a space, said fluid flowing in said space between said circular sealing face and said mating ring into said fluid receiving compartment, thereby to provide a dynamic sealing element, the space between said circular sealing face and said mating ring approximating one hundred micro-inches, said fluid in said space between said circular sealing face and mating ring damping the axial movement of said dynamic sealing ring.

5. A fluid seal assembly comprising a rotatable shaft having a radially extending substantially flat surface thereon, a housing receiving said shaft therein and defining a pressure chamber, a sealing ring having a pair of generally opposed radial surfaces thereon, said ring receiving said shaft in the opening thereof and mounted in said housing in axial floating relationship to said radial shaft surface, one of said radial ring surfaces being exposed during operation of said assembly to said pressure chamber, the other of said radial ring surfaces having an inner peripheral edge and an outer peripheral edge and confronting said shaft surface to form a fluid film producing region therebetween, said other ring surface having one edge thereof exposed to said pressure chamber and having the other edge thereof exposed to a relatively low pressure region in said housing, said other ring surface having an offset portion intermediate said edges and extending to said one edge thereof, said offset portion being formed to increase the thickness of said film producing region adjacent said one edge of said ring substantially all of said other ring surface being parallel to said radially extending shaft surface.

References Cited

UNITED STATES PATENTS

| | | | |
|---|---|---|---|
| 2,221,225 | 11/1940 | Weis et al. | 277—3 XR |
| 2,814,512 | 11/1957 | Quinn et al. | 277—27 XR |
| 2,907,594 | 10/1959 | Macks | 277—74 XR |
| 2,967,487 | 1/1961 | Nagely. | |
| 2,984,507 | 5/1961 | Welch | 277—27 |
| 3,075,778 | 1/1963 | Bowers et al. | 277—27 XR |
| 3,156,191 | 11/1964 | Lanck | 277—63 XR |

SAMUEL ROTHBERG, Primary Examiner

U.S Cl. X.R.

103—126; 277—73